United States Patent [19]

Lucian et al.

[11] Patent Number: 4,520,848
[45] Date of Patent: Jun. 4, 1985

[54] RAPIER OR GRIPPER WEAVING MACHINE

[75] Inventors: Anton Lucian; Kurt Geiger, both of Arbon, Switzerland

[73] Assignee: Aktiengesellschaft Adolph Saurer, Arbon, Switzerland

[21] Appl. No.: 586,829

[22] Filed: Mar. 6, 1984

[30] Foreign Application Priority Data

Mar. 23, 1983 [CH] Switzerland ............... 1575/83

[51] Int. Cl.³ ............................................. D03J 1/00
[52] U.S. Cl. .................................. 139/1 R; 139/45; 139/449; 184/6.26; 184/6
[58] Field of Search ................ 139/1 R, 45, 449; 184/6.26, 7, 12, 6.12, 6.24, 6.28, 7 R, 26, 27 R, 6

[56] References Cited

U.S. PATENT DOCUMENTS

| 4,003,409 | 1/1977 | Steffens | 139/45 |
| 4,188,980 | 2/1980 | Muller | 139/1 R |
| 4,444,292 | 4/1984 | Brown et al. | 184/6 |
| 4,448,285 | 5/1984 | Burbacher | 139/1 R |

Primary Examiner—Henry S. Jaudon
Attorney, Agent, or Firm—Werner W. Kleeman

[57] ABSTRACT

In the rapier or gripper weaving machine a rapier or gripper rod is moved to-and-fro by a drive gear or wheel. An oil lubricating device is provided whose spray nozzle opens in the vicinity of the drive gear or wheel. This spray nozzle is connected to a pressure conduit located at the exit or outlet side of a mixing chamber. In the mixing chamber, a predeterminable quantity of oil taken from an oil reservoir can be admixed with a continuously transmitted flow of compressed air. A timer serves for the periodic activation of an oil dosing and injecting device located upstream or forwardly of the mixing chamber. The dosing action controlled by the timer periodically mixes a predetermined volume of oil into the continuous flow of compressed air being supplied to the spray nozzle. The spray nozzle is a molecular atomizing nozzle. These measures enable an absolutely accurate, constant and adjustable quantity of oil to be admixed with the flow of compressed air and further provide a practically droplet-free mist of oil at the drive gear or wheel of the rapier or gripper rod.

5 Claims, 1 Drawing Figure

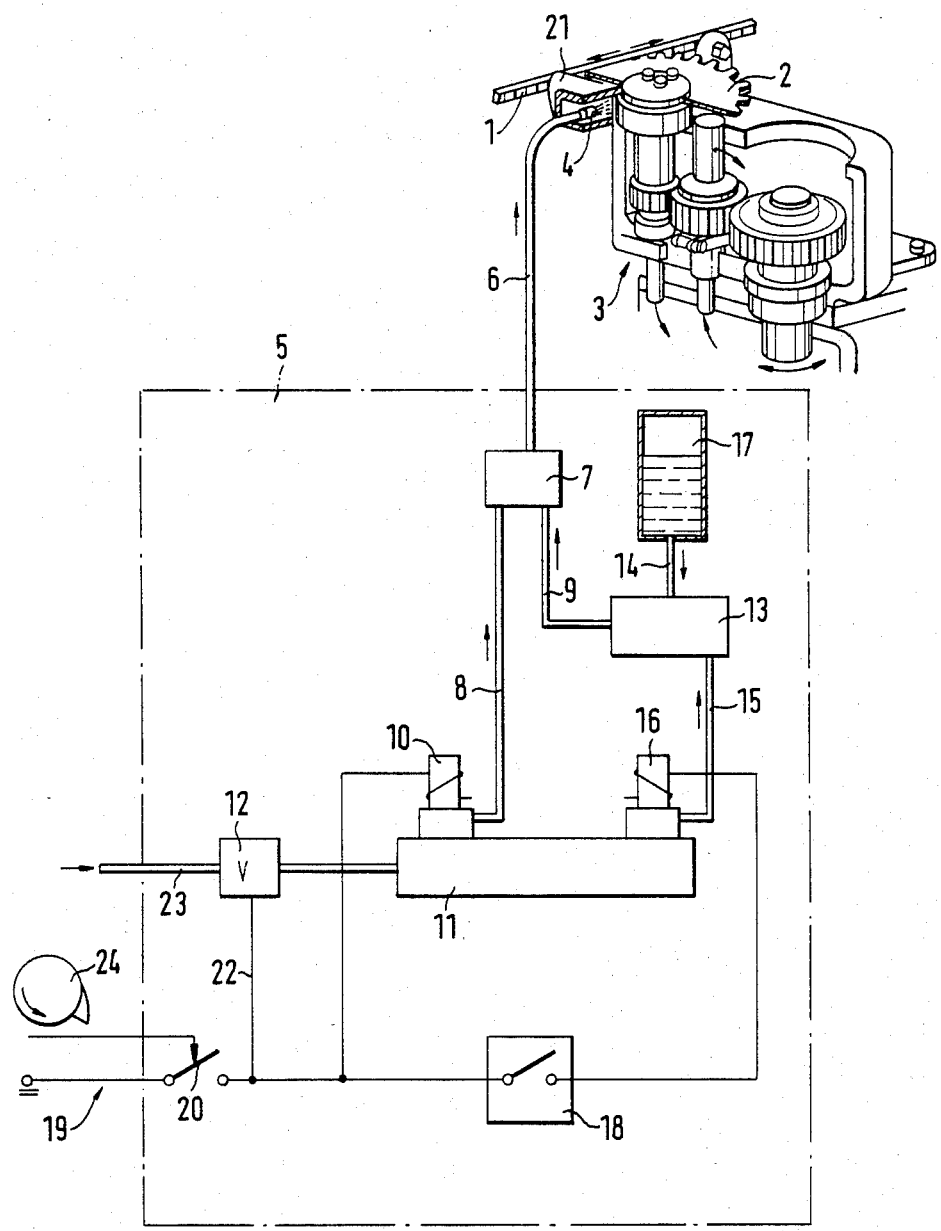

RAPIER OR GRIPPER WEAVING MACHINE

BACKGROUND OF THE INVENTION

The present invention broadly relates to a rapier or gripper weaving machine or loom, and, more specifically, pertains to a new and improved construction of a lubricating device for such rapier or gripper weaving machine or loom.

Generally speaking, the rapier weaving machine of the present invention comprises a drive gear or wheel imparting to-and-fro motion to a rapier or gripper or the like. It further comprises an oil lubricating arrangement or device whose spray nozzle opens in the vicinity of the drive gear or wheel. The spray nozzle is connected to a pressure conduit or line exiting from the outlet side of a mixing chamber or compartment. In the mixing chamber a predetermined quantity of oil taken from an oil reservoir can be mixed with a continuously transmitted flow of pressurized air.

In gripper weaving machines of the previously mentioned type, the problem arises of providing adequate lubrication between the rapier or gripper rod and its drive element, such as a gear or wheel without an excess of oil. In addition to the fact that oil droplets deposited on the drive gear or wheel are thrown off such drive gear or wheel by its high peripheral speed and lead to soiling of the woven cloth or fabric, an excess of oil causes lubrication remnants to form on the rapier or gripper rod. The oil remnants attract fiber fly or the like, sizing dust and so forth and form lumps which fall into the weaving or loom shed and are there woven into the fabric or cloth. This leads to a considerable reduction in the quality of the produced fabric or cloth.

In order to counter this problem, the assignee of the present invention has already employed oil lubrication devices in which small quantities of oil are constantly admixed by a dosing device to a constant flow of pressurized air. The mixture is then sprayed onto the drive gear or wheel by means of a spray nozzle.

Experience has shown, however, that these measures are not adequate to overcome the previously mentioned difficulty of excessive lubrication. It is not possible with these known measures to adjust the oil supply below a certain minimum rate. Below a certain minimum level of adjustment the supply of oil becomes irregular or breaks down.

SUMMARY OF THE INVENTION

Therefore, with the foregoing in mind, it is a primary object of the present invention to provide a new and improved construction of a gripper weaving machine which does not have associated with it the aforementioned drawbacks and shortcomings of the prior art constructions.

Another and more specific object of the present invention aims at providing a new and improved construction of a gripper weaving machine of the previously mentioned type in which an oil lubrication device is structured to provide an absolutely or essentially constant, accurate and adjustable quantity of oil which is to be mixed with a flow of pressurized air and to deposit a practically droplet-free mist of air-oil mixture on the drive element, such as the drive gear or wheel of the rapier or gripper rod.

Yet a further significant object of the present invention aims at providing a new and improved construction of an oil lubrication device for a gripper weaving machine of the character described, which lubrication device is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the rapier or gripper weaving machine of the present invention is manifested by the features that a timer is provided for the periodical operation of an oil dosing and injecting device arranged upstream or forwardly of the mixing chamber to periodically admix a predetermined volume of oil into the continuous flow of air supplied to the spray nozzle which is constructed as a molecular atomizing nozzle.

The employment of a timer for the periodical or intermittent operation of an oil dosing and injecting device according to the invention permits the periodical or intermittent admixture of oil to the flow of pressurized air while retaining the advantage of a continuous cooling of the drive gear or wheel by the continuous flow of pressurized or compressed air. It also provides the possibility to arbitrarily regulate the total supply of oil per unit of time by changing the frequency of the timing pulses and, in particular, to regulate the supply of oil to be so low that all of the oil supplied is consumed at the drive gear or wheel and a soiling of the rapier or gripper rod such as described above is avoided.

By structuring the spray nozzle according to the invention as a molecular atomizing nozzle the further advantage is obtained that the relatively large oil droplets contained in the pressurized air-oil mixture in the infeed or supply conduit to the spray nozzle are, to a considerable extent, further reduced. Thus, an extremely fine oil mist is supplied to the drive gear or wheel whose adhesion or clinging properties are greater than the centrifugal forces tending to throw the oil off the drive gear or wheel.

A relatively simple and reliable design results when the operation of the oil dosing and injection device is performed by a solenoid valve controlled by the timer and the solenoid valve connects the oil dosing and injecting device with a pressurized air chamber which, in turn, is connected to a source of pressurized air and, by a further solenoid valve, to the mixing chamber. It is advantageous to incorporate both of the solenoid valves and the timer into an electrical circuit which is closed by a switch when the machine is in operation.

In order not to contaminate the ambient air in the region of the spray nozzle it is practical to cover or enclose the region of the molecular atomizing nozzle opening at the drive gear or wheel with a cover or housing.

BRIEF DESCRIPTION OF THE DRAWINGS

The invention will be better understood and objects other than those set forth above, will become apparent when consideration is given to the following detailed description thereof. Such description makes reference to the annexed drawing wherein the single FIGURE shows, partly as a schematic diagram and partly as a partial section in three-dimensional representation, the region of the rapier or gripper rod drive of the rapier or gripper weaving machine according to the invention and the oil lubrication device associated therewith.

DETAILED DESCRIPTION OF THE PREFERRED EMBODIMENTS

In the single figure of the drawing, a rapier or gripper weaving machine or loom of the aforementioned type is merely generally conveniently symbolically represented by its rapier or gripper rod drive or drive mechanism 3. This drive mechanism 3 comprises the rapier or gripper rod 1 which is to be moved to-and-fro and the drive element, such as the drive gear or wheel 2 meshing therewith.

In order to provide the minimal yet reliable degree of lubrication envisaged by the objects of the present invention a spray nozzle 4 of the schematically shown oil lubrication device 5 to be described in greater detail in the following description opens at the drive gear or wheel 2.

The spray nozzle 4, constituted by a molecular atomizing nozzle, is connected to a pressure conduit or line 6. The pressure conduit or line 6 forms the outlet of a mixing chamber or compartment 7 of the oil lubrication device 5. This mixing chamber 7 is connected at its inlet side with a compressed or pressurized air conduit or line 8 and an oil injection conduit 9.

The aforementioned pressurized air conduit 8 connects the mixing chamber 7 with a pressurized air chamber or compartment 11 by means of a suitable control valve, here a solenoid valve 10. The pressurized air chamber 11 is advantageously connected to a suitable source of compressed or pressurized air known as such, for instance a conventional compressor (not shown in the drawings), via a pressure reducing valve 12 and a supply or infeed conduit or line 23.

The aforementioned oil injection conduit or line 9 connects the mixing chamber or compartment 7 with an oil dosing and injecting device 13. This oil dosing and injecting device 13 is connected by a riser or line 14 with an oil reservoir 17 and through a further pressurized air conduit or line 15 and a further control valve, such as the solenoid valve 16 with the previously mentioned pressurized air chamber or compartment 11. By this arrangement a not particularly visible dosing and injecting piston of the oil dosing and injecting device 13 can be operated through the open solenoid valve 16 by pressurized air from the pressurized air chamber 11. This method of operation is known as such and need not be discussed in greater detail here.

It is, however, a significant feature of the invention, to provide a timer 18 in order to periodically operate the oil dosing and injecting device 13 through the corresponding solenoid valve 16. This permits the periodical admixture of a predetermined amount of oil to the flow of pressurized air continuously supplied to the spray nozzle 4 from the pressurized air chamber 11 by means of the solenoid valve 10, the pressurized air conduit 8, the mixing chamber 7 and the pressurized air conduit 6. Thus, the oil can be supplied intermittently while the substantially constant cooling effect of the flow of pressurized air on the drive gear or wheel 2 is maintained. In this manner it is possible to regulate the total supply of oil per unit of time to any desired degree by changing the frequency of the timer pulses. In particular, it is possible to regulate the flow of oil to be so low that all of the oil supplied is consumed at the drive gear or wheel 2 and the previously mentioned soiling of the rapier or gripper rod 1 is avoided.

It is further advantageous to arrange the solenoid valves 10 and 16 as well as the timer 18 in an electrical circuit 19 which is closed by a switch 20 when the machine is in operation. The previously mentioned pressure reducing valve 12 in the pressurized air supply conduit 23 can also be connected to the electrical circuit 19 by an electrical lead 22. The switch 20 can, for instance, be operated by a cam actuator 24 of the machine or any other suitable or equivalent control.

It is a further significant feature of the invention to structure the previously mentioned spray nozzle 4 as a molecular atomizing nozzle. This has the effect of reducing, to a considerable degree, the relatively large oil droplets contained in the air in the supply conduits 6, 7 leading to the spray nozzle 4 and so produce an extremely fine oil mist at the drive gear or wheel 2, whose clinging properties are greater than the centrifugal forces acting there so that the oil is prevented from being thrown-off the drive gear or wheel 2 or the like.

In order not to contaminate the ambient air in the region of the spray nozzle 4, it is advantageous to cover or enclose the region of such molecular atomizing spray or nozzle 4 opening at the drive gear or wheel 2 with a cover or housing 21 defining a closure hood.

The measures described above provide an arrangement which fulfills all of the aforementioned requirements and objects and, in particular, permits the periodical admixture of oil to the flow of compressed or pressurized air while maintaining the advantage of a continuous cooling of the drive gear or wheel 2 under the effect of the continuous flow of pressurized air while at the same time permitting any desired degree of regulation of the total supply of oil per unit of time by appropriately modifying the frequency of the timer pulses. In particular, it permits regulating the total supply of oil to be so low that all of the oil supplied is consumed at the drive gear or wheel 2 and the aforementioned soiling or contamination of the rapier or gripper rod 1 is avoided. The further effect is obtained that the relatively large oil droplets contained in the pressurized air-oil mixture in the supply conduits 6, 7 to the spray nozzle 4 are further divided to a considerable degree, thus supplying an extremely fine oil mist to the drive gear or wheel 2. Furthermore, the aforementioned arrangement is very simple in construction and is practically maintenance-free and very reliable. Finally, the design of this arrangement permits ready modification or retrofitting of existing machines.

While there are shown and described present preferred embodiments of the invention, it is to be distinctly understood that the invention is not limited thereto, but may be otherwise variously embodied and practiced within the scope of the following claims. Accordingly,

What we claim is:

1. A rapier weaving machine having a rapier, comprising:
   a drive element for imparting to-and-fro motion to the rapier of the rapier weaving machine;
   an oil lubrication device having a spray nozzle opening in proximity to said drive element;
   a pressurized conduit with which there is operatively connected said spray nozzle;
   said oil lubrication device comprising a mixing chamber having an outlet;
   said pressurized conduit being connected to said outlet of said mixing chamber;
   said oil lubrication device further comprising;
       means for continuously transmitting a flow of pressurized air through said mixing chamber;

an oil reservoir for supplying predetermined quantities of oil to said mixing chamber for admixture with said continuously transmitted flow of pressurized air through the mixing chamber;

an oil dosing and injecting device arranged upstream of the mixing chamber and operatively connected with said mixing chamber;

a timer provided for the periodical operation of said oil dosing and injecting device to periodically admix a predetermined volume of oil with the continuous flow of pressurized air supplied to the spray nozzle; and said spray nozzle being a molecular atomizing nozzle.

2. The rapier weaving machine as defined in claim 1, wherein:

said oil lubrication device further comprises a solenoid valve controlled by said timer to periodically operate said oil dosing and injecting device;

said means for continuously transmitting said flow of pressurized air comprises a pressurized air chamber connectable to a source of pressurized air and connected to said oil dosing and injecting device by said solenoid valve; and a further solenoid valve connecting said pressurized air chamber with said mixing chamber.

3. The rapier weaving machine as defined in claim 2, further including:

an electrical circuit incorporating said solenoid valve and said further solenoid valve and said timer; and a switch for closing said electrical circuit when the rapier weaving machine is in operation.

4. The rapier weaving machine as defined in claim 1, further including:

a housing for surroundingly enclosing the region of said molecular atomizing nozzle opening at said drive element.

5. The rapier weaving machine as defined in claim 1, wherein:

said drive element comprises a drive gear.

* * * * *